(12) United States Patent
Ikegami et al.

(10) Patent No.: US 6,414,759 B1
(45) Date of Patent: *Jul. 2, 2002

(54) COMMUNICATION APPARATUS AND METHOD

(75) Inventors: Itaru Ikegami; Shinji Todaka, both of Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/659,181

(22) Filed: Jun. 6, 1996

(30) Foreign Application Priority Data

| Jun. 8, 1995 | (JP) | .............................. 7-167023 |
| Mar. 29, 1996 | (JP) | .............................. 8-104427 |

(51) Int. Cl.[7] ................................. H04N 1/40

(52) U.S. Cl. ....................... 358/444; 358/400; 358/403; 358/404

(58) Field of Search ................................. 358/444, 434, 358/436, 440, 402, 438, 442, 404, 403, 400

(56) References Cited

U.S. PATENT DOCUMENTS

| 5,270,833 A | * | 12/1993 | Kubokawa et al. ......... 358/434 |
| 5,410,419 A | * | 4/1995 | Muramatsu et al. ........ 358/468 |
| 5,537,231 A | * | 7/1996 | Hisada et al. ............... 358/530 |
| 5,717,744 A | * | 2/1998 | Yoshida et al. ............. 379/100 |
| 5,719,686 A | * | 2/1998 | Sakamoto et al. .......... 358/444 |
| 5,754,745 A | * | 5/1998 | Sato ........................... 395/113 |
| 5,933,246 A | * | 8/1999 | Ono ............................ 358/404 |
| 5,956,162 A | * | 9/1999 | Nobuta ....................... 358/500 |
| 6,031,637 A | * | 2/2000 | Shibata et al. .............. 358/468 |

FOREIGN PATENT DOCUMENTS

JP    6125469    5/1994

* cited by examiner

Primary Examiner—Leo Boudreau
Assistant Examiner—Kanji Patel
(74) Attorney, Agent, or Firm—Fitzpatrick, Cella, Harper & Scinto

(57) ABSTRACT

An apparatus capable of forming both color and monochrome images is disclosed which when a document containing a color page is received while a memory reception mode is set, i.e., while the received document is controlled not to be output, (1) all pages of this received document only are output, (2) only color pages of this document are output, (3) all pages of this document only are transferred to an external apparatus, or (4) only color pages of this document are transferred to the external apparatus, in order for an image memory to be prevented from being made full and entering a reception disable state.

10 Claims, 20 Drawing Sheets

SINCE A PAGE FOLLOWING
THIS SENTENCE HAS BEEN
RECEIVED IN COLOR,
THE PAGE HAS BEEN OUTPUT

RECEPTION NUMBER 2613

PAGE 2

COMMUNICATION APPARATUS AND METHOD

BACKGROUND OF THE INVENTION

1. Field of the Invention

The present invention relates to a communication apparatus and method and to an image processing apparatus and method.

2. Related Background Art

Generally a color image requires an amount of codes larger than a monochrome binary image. Therefore, a facsimile apparatus a relatively small capacity of image memories because of cost reduction finds it difficult to store a plurality of pages of coded color images.

A conventional facsimile apparatus having a transmission/reception function of only a monochrome image has been developed which has an enforced memory reception function of storing in an image memory a document received during a predetermined time period such as in the night, without outputting it at once for security purposes.

However, even if a document containing a color image received during a predetermined time period is to be stored in an image memory without outputting it for security purposes, the image memory of a facsimile apparatus having not so large a capacity for cost reduction becomes full in a short time because a color image has an amount of codes larger than a monochrome binary image. Therefore, after the color image is received, an additional document cannot be received.

SUMMARY OF THE INVENTION

It is an object of the present invention to provide a communication apparatus and method capable of reliably performing a memory reception of both monochrome binary and color images.

It is another object of the present invention to provide a communication apparatus and method capable of preventing a memory for storing received data from overflowing.

It is another object of the present invention to provide a communication apparatus connected to a host computer.

According to a preferred embodiment of the invention achieving the above objects, an apparatus capable of forming both color and monochrome images is disclosed in which when a document containing a color page is received while a memory reception mode is set, i.e., while the received document is controlled not to be output, (1) all pages of this received document only are output, (2) only color pages of this document are output, (3) all pages of this document only are transferred to an external apparatus, or (4) only color pages of this document are transferred to the external apparatus, in order for an image memory to be prevented from being made full and entering a reception disable state.

Preferably, the external apparatus is a system using a host computer.

It is another object of the present invention to provide a medium for storing programs running a host computer which is used with a communication apparatus of an embodiment.

The above and other objects and features of this invention will become apparent from the following embodiments when read in conjunction with the accompanying drawings.

DETAILED DESCRIPTION OF THE PREFERRED EMBODIMENTS

Figure 1:
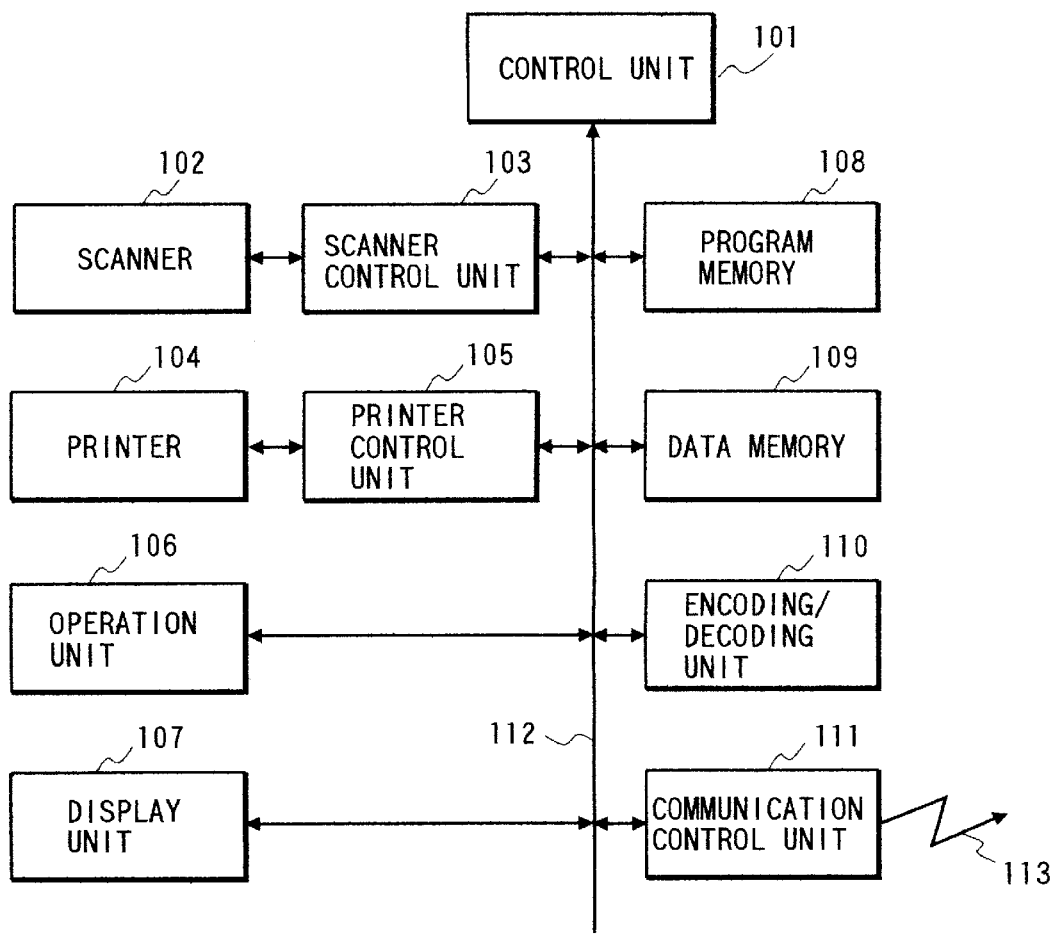
FIG. 1 is a block diagram showing the structure of a facsimile apparatus according to first to fourth embodiments of the invention.

FIG. 1 is a block diagram showing the structure of a facsimile apparatus according to the first to fourth embodiments of the invention.

A control unit 101 controls the whole of the facsimile apparatus. A scanner 102 reads an original image with a CCD or the like and can read both color and monochrome images. A scanner control unit 103 controls the scanner 102.

A printer 104 prints and outputs an image and can output both color and monochrome images. A printer control unit 105 controls the printer 104.

An operation unit 106 is a keyboard from which an operator enters various key-inputs, and has a setting switch for setting an enforced memory reception mode. A display unit 107 is an LCD or the like on which information is displayed. A program memory 108 stores programs, and a data memory 109 stores data.

An encoding/decoding unit 110 encodes/decodes image data and has a function of encoding/decoding both color and monochrome images. A communication control unit 111 performs a connection control of a communication line 113 or the like. A bus 112 interconnects the above described units.

Operations of the apparatus of the embodiments constructed as above will be described.

Figure 2:
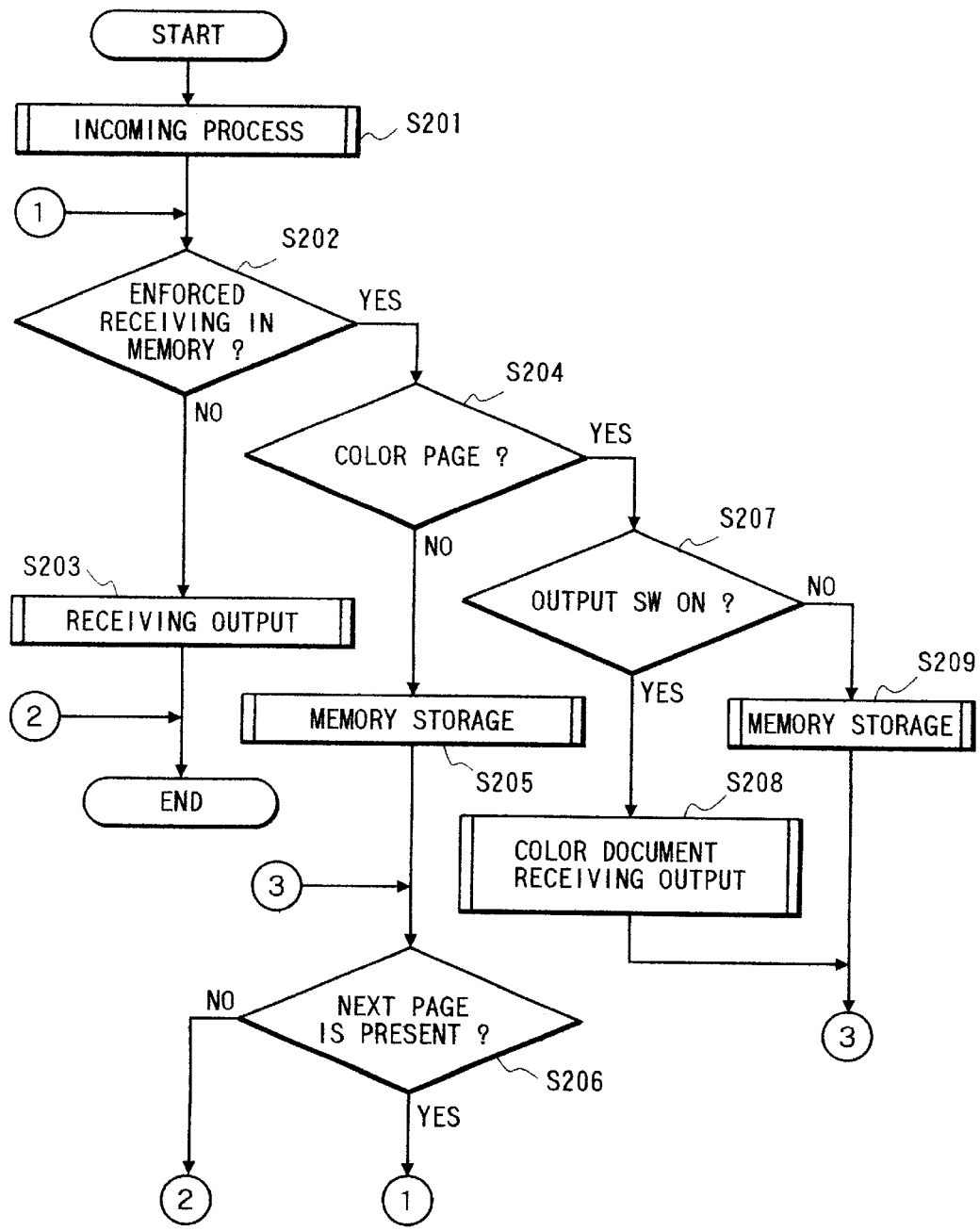
FIG. 2 is a flow chart illustrating an operation sequence of the first embodiment of the invention.

FIG. 2 is a flow chart illustrating an operation sequence of the first embodiment.

First an incoming process is performed at S201. At this step, the number of a partner apparatus, an incoming time, and the like are obtained. Next, it is checked whether the present mode is an "enforced memory reception" or not (S202).

If not, an ordinary reception output process is performed (S203) to terminate this sequence.

If it is judged at S202 that the present mode is the enforced memory reception mode, it is checked whether or not the page to be received is a color page (S204).

If not, i.e., if a monochrome page, a memory storage is performed (S205).

Figure 3:
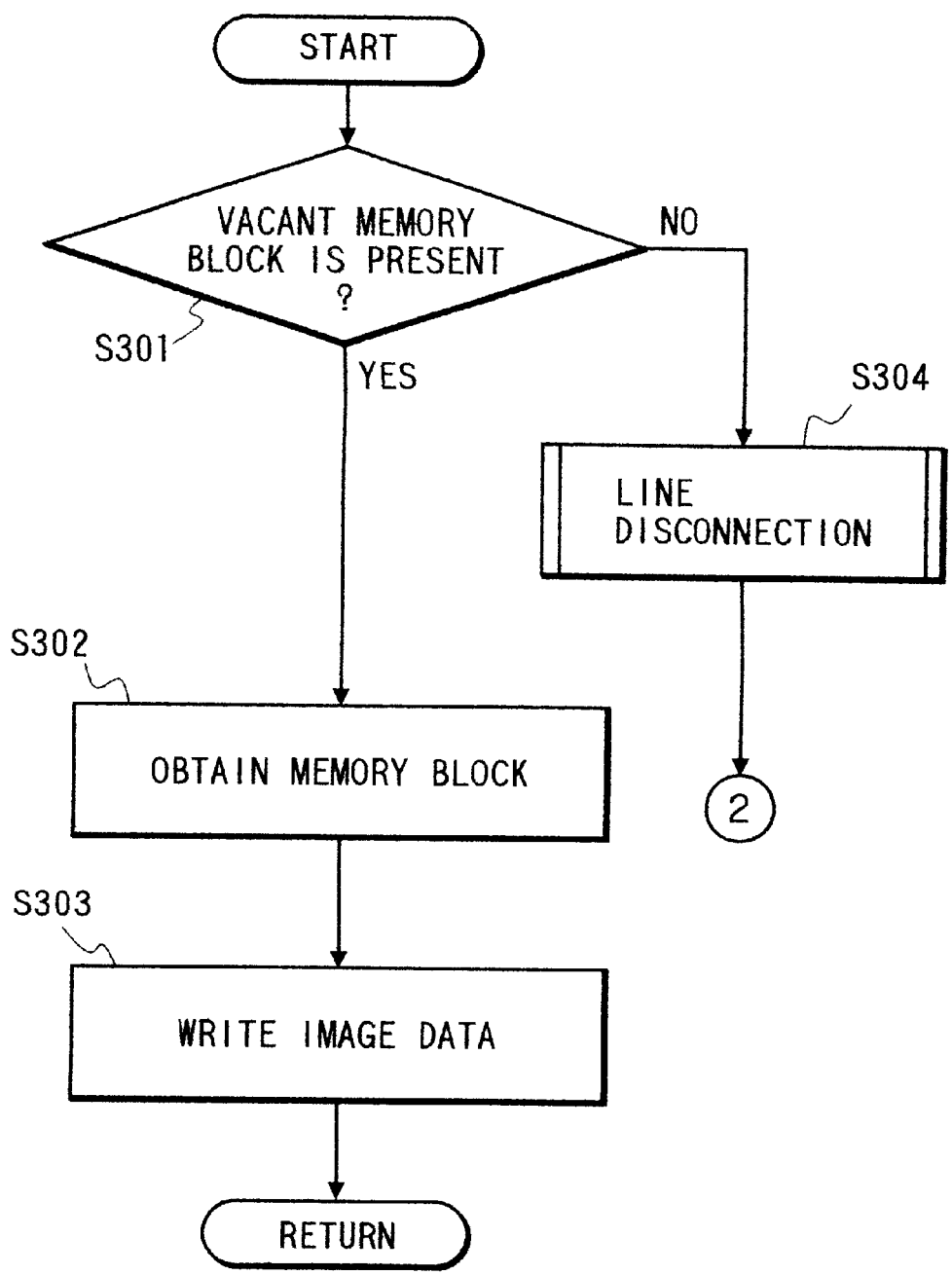
FIG. 3 is a flow chart illustrating an operation sequence of storing data in an image memory according to the first to fourth embodiments.

FIG. 3 is a flow chart illustrating a sequence of storing data in the image memory.

First, it is checked whether or not there is a vacant memory block (S301). A vacant memory block is a memory block which can be used for the reception process, and may be a reserved block for copy or report formation. With the reserved memory block, a copy or report output is possible even if a full state of the memory occurs during the reception process.

If there is a vacant memory block at S301, the memory block is acquired (S302), and the received image data is written (S303) to thereafter terminate this sequence.

If there is no vacant memory block at S301, a line disconnection process is executed (S304). In this line disconnection process, the memory block used by the received page is discarded and a line disconnection is notified to an operator by a displayed notice, alarm sounds, or voices, and if necessary a report is output.

After completion of the line disconnection process, this sequence is terminated. After completion of the memory storage as above, it is checked whether there is the next received page (S206).

If there is the next received page, the sequence returns to S202 to repeat this sequence to the last received page.

If it is judged at S204 that the received page is a color page, it is checked whether a color page enforced output switch SW is on, the switch SW determining whether the color page received during the enforced memory reception mode is output (S207).

If the color page enforced output switch SW is on, a color page reception output process is performed (S208).

Figure 4:
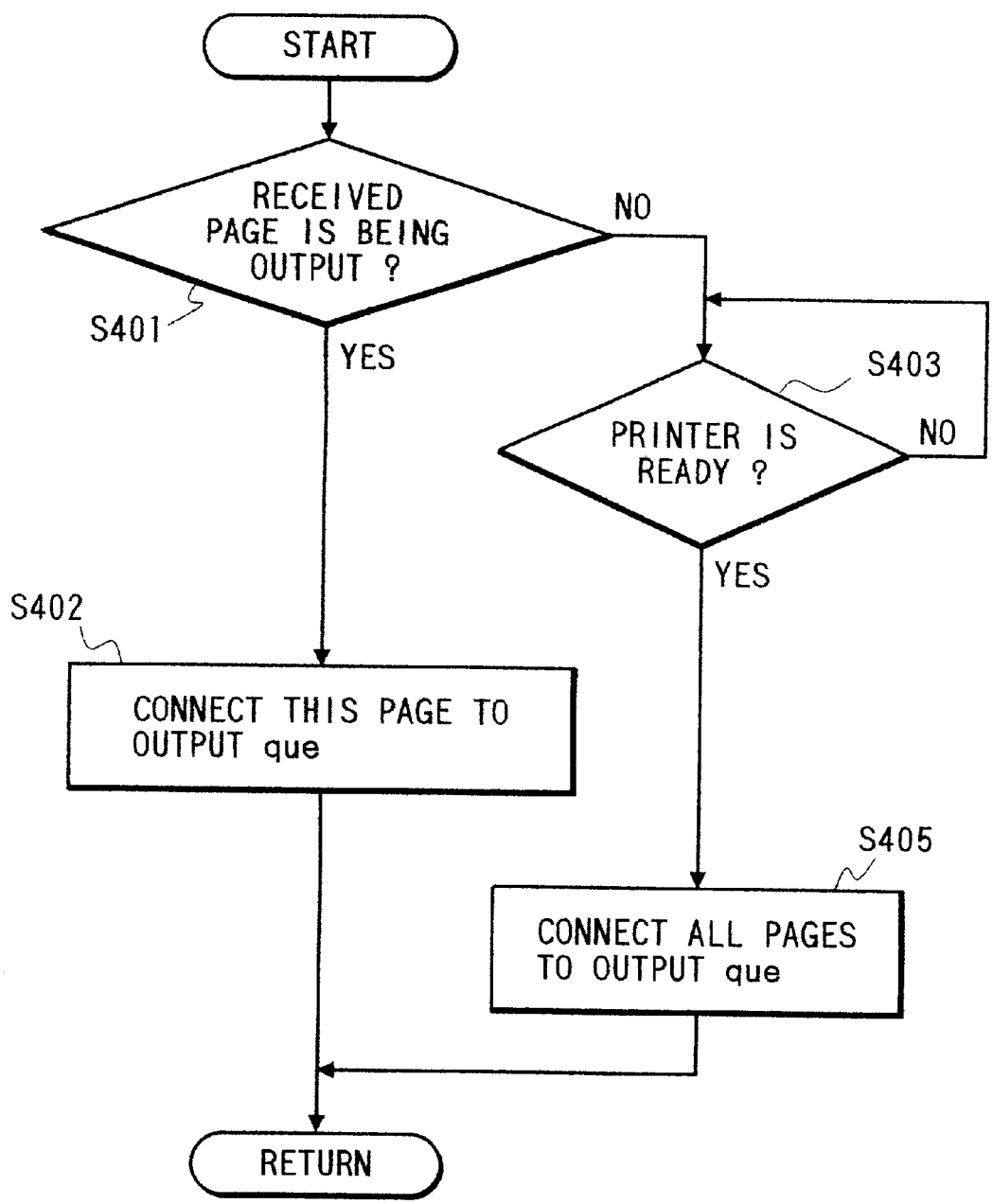
FIG. 4 is a flow chart illustrating an operation sequence of a color page reception output process according to the first to fourth embodiments.

FIG. 4 is a flow chart illustrating an operation sequence of the color page reception output process.

Figure 5:
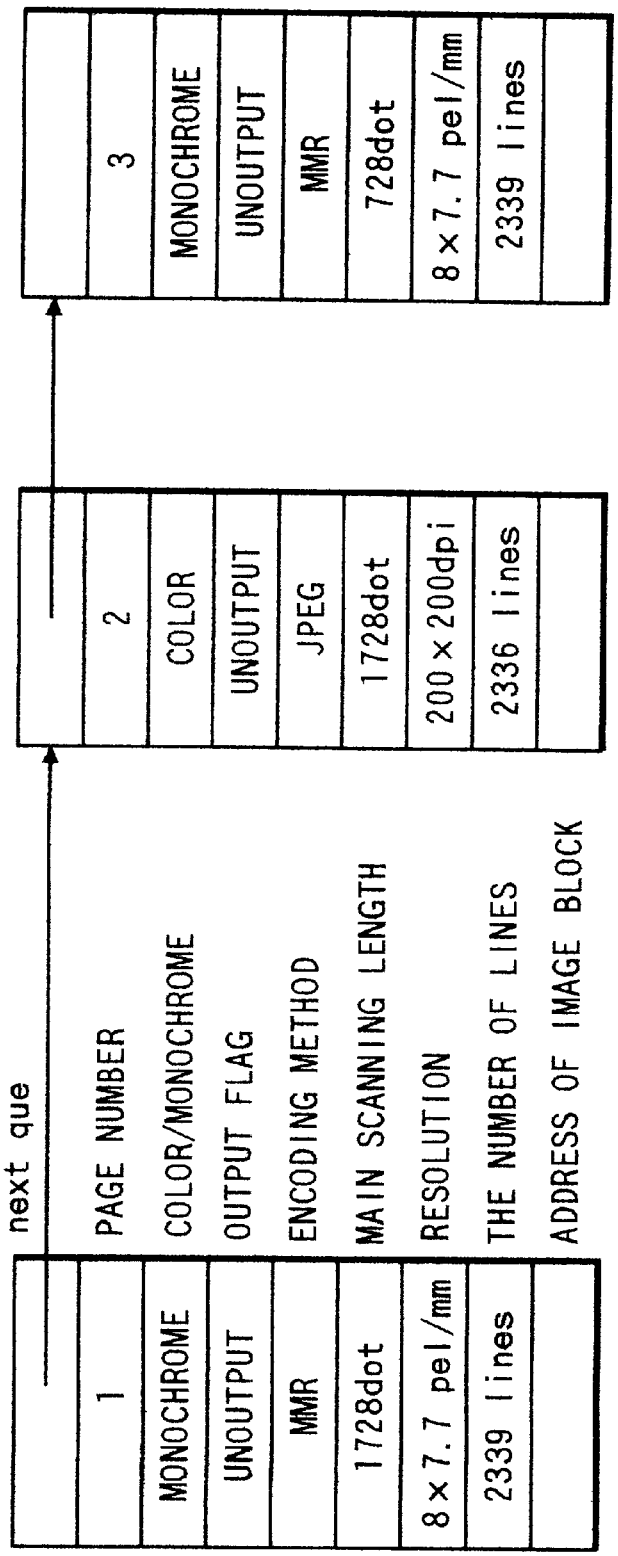
FIG. 5 is an explanatory diagram showing a format of page information according to the first to fourth embodiments.

It is first checked whether the preceding received pages have been already connected to an output process que (queue) (S401). Page information is shown in FIG. 5 in which information of each page indicates the information of the next page.

If it is judged that the preceding received pages have been already connected to the output process que, the presently receiving page is connected to the output process que (S402) to terminate this sequence.

If it is judged at S401 that the preceding pages are still not connected to the output process que, it is confirmed whether the printer is now in a ready state (S403). If not in the ready state, the sequence returns to S403 to await until the printer enters the ready state.

If the printer is in the ready state at S403, all pages including the presently receiving page are connected to the output process que. After completion of the color document reception output process at S208, it is checked whether there is the next page (S206).

If there is the next page, the sequence returns to S207 to repeat the sequence until the last received page is processed. If the color page enforced output switch SW is off at S207, the memory storage process shown in FIG. 3 is executed (S209) and it is checked whether there is the next received page (S206).

If there is the next received page, the sequence returns to S202 to repeat this sequence to the last received page.

Figure 6:
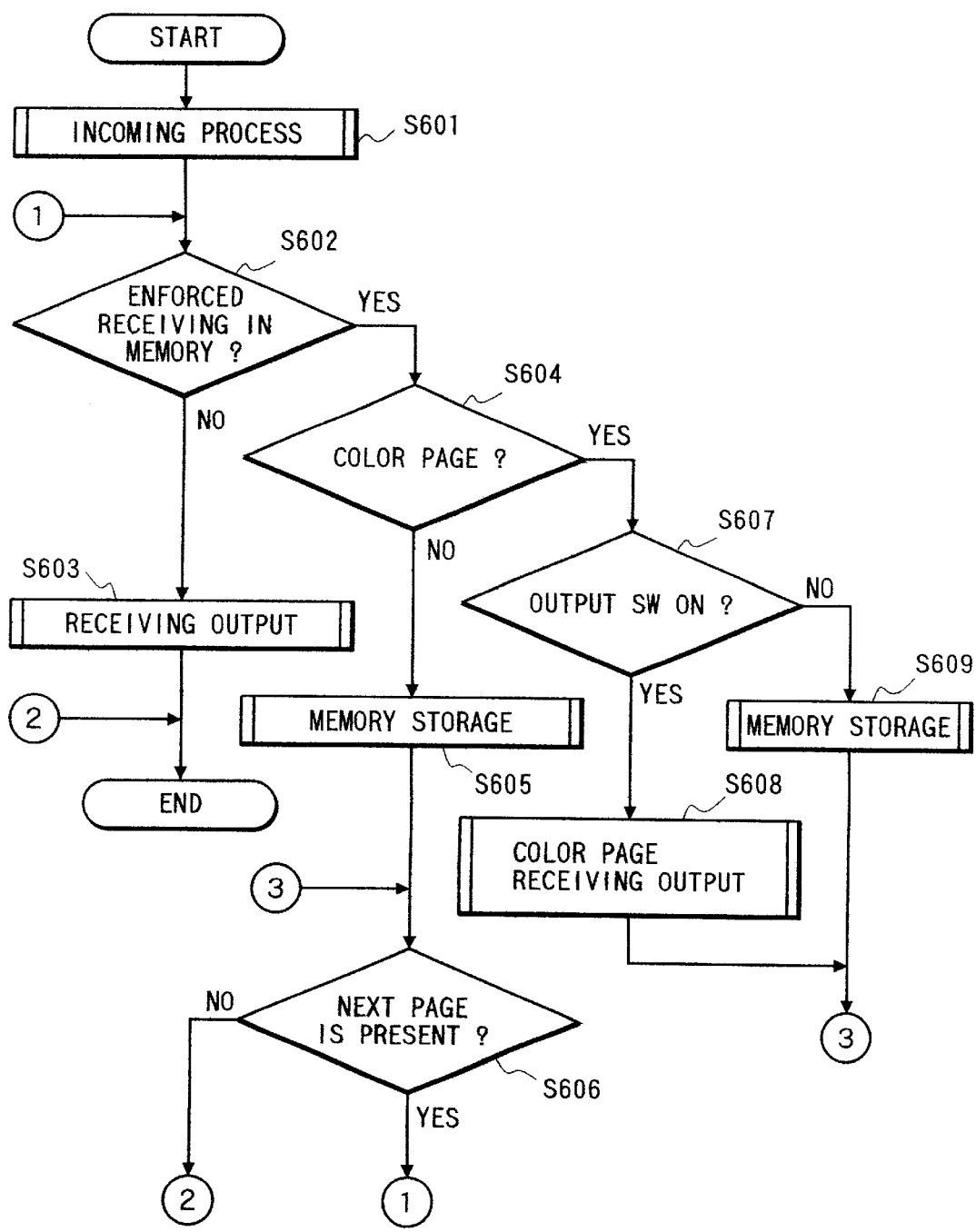
FIG. 6 is a flow chart illustrating an operation sequence of the second embodiment of the invention.

Next, the second embodiment of the invention will be described. FIG. 6 is a flow chart illustrating an operation sequence of the second embodiment.

First an incoming process is performed at S601. At this step, the number of a partner apparatus, an incoming time, and the like are obtained. Next, it is checked whether the present mode is the "enforced memory reception" or not (S602).

If not, an ordinary reception output process is performed (S603) to terminate this sequence. If it is judged at S602 that the present mode is the enforced memory reception mode, it is checked whether or not the page to be received is a color page (S604).

If not, i.e., if a monochrome page, a memory storage is performed (S605). In this memory storage process, as shown in FIG. 3, it is first checked whether or not there is a vacant memory block (S301). The vacant memory block is a memory block which can be used for the reception process, and may be a reserved block for copy or report formation. With the reserved memory block, a copy or report output is possible even if a full state of the memory occurs during the reception process.

If there is a vacant memory block at S301, the memory block is acquired (S302), and the received image data is written (S303) to thereafter terminate this sequence.

If there is no vacant memory block at S301, a line disconnection process is executed (S304). In this line disconnection process, the memory block used by the received page is discarded and a line disconnection is notified to an operator by a displayed notice, alarm sounds, or voices, and if necessary a report is output. After completion of the line disconnection process, this sequence is terminated.

After completion of the memory storage as above, it is checked whether there is the next received page (S606). If there is the next received page, the sequence returns to S602 to repeat this sequence to the last received page.

If it is judged at S604 that the received page is a color page, it is checked whether the color page enforced output switch SW is on, the switch SW determining whether the color page received during the enforced memory reception mode is output (S607). If the color page enforced output switch SW is on, a color page reception output process is performed (S608).

In the color page reception output process, a new page information area is obtained to copy the page information of the color page therein and connect to the output process que. In this case, the old page information area is left unchanged.

After completion of the color document reception output process at S608, it is checked whether there is the next page (S606). If there is the next page, the sequence returns to S602 to repeat the sequence until the last received page is processed.

If the color page enforced output switch SW is off at S607, the memory storage process shown in FIG. 3 is executed (S609) and it is checked whether there is the next received page (S606). If there is the next received page, the sequence returns to S602 to repeat this sequence to the last received page.

Figure 7:
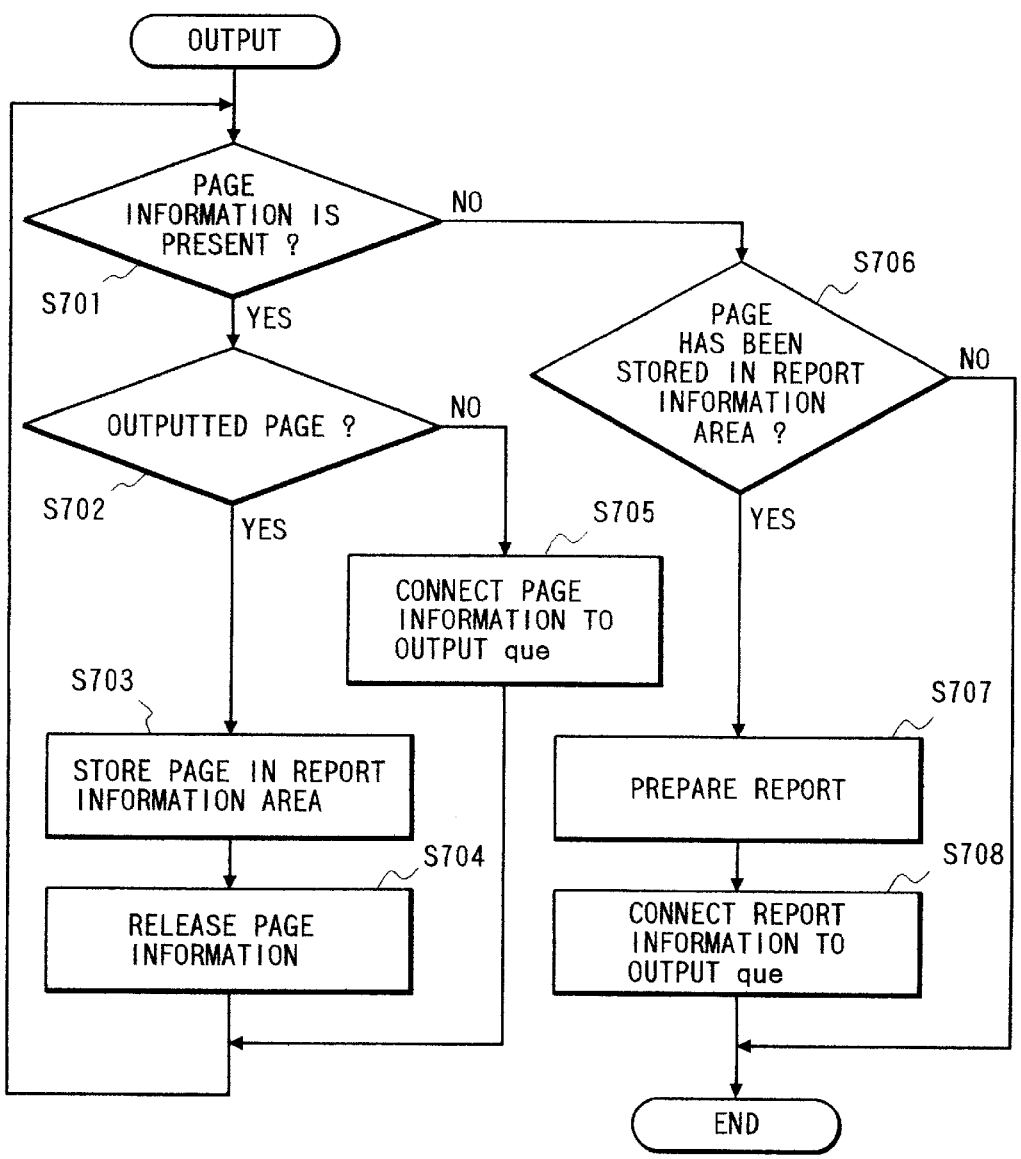
FIG. 7 is a flow chart illustrating an operation sequence of the third embodiment of the invention.

Next, the third embodiment of the invention will be described. FIG. 7 is a flow chart illustrating the operation sequence of the third embodiment. In this sequence, a received document not still output is output after a predetermined time lapse or by predetermined operations.

It is checked whether there is page information of an output document (S701). If there is page information, it is checked whether the page has already been output (S702). This check can be performed by referring to an output flag of the page information shown in FIG. 5. If it is judged that the page has already been output, i.e., if the received page is a color page and was output upon reception, then the page number of this page is stored in the report information area (S703).

It is judged that this page information has already been used, and this page information is released (S704) and the sequence returns to S701 to process the next page.

If it is judged at S702 that the page has not yet been output, the page information is connected to the output process queue for the output process (S705).

The page information connected to the output que is sequentially output to the printer starting from the top of the output process que when the image output program is activated, although this process is not illustrated in the flow chart of FIG. 7. After completion of output of each page, the page information is released.

After the page information is connected to the output que at S705, the sequence returns to S701 to process the next page. If it is judged at S701 that there is no page information of the output document, it is judged that all pages have been passed to the output process program, and it is checked whether the page number stored at S703 is being stored in the report information area (S706).

If there is no page number stored, this sequence is terminated. If it is judged at S706 that one or more page numbers are being stored, a report is formed (S707) and the page information of the report is connected to the output process que (S708).

Figure 8:
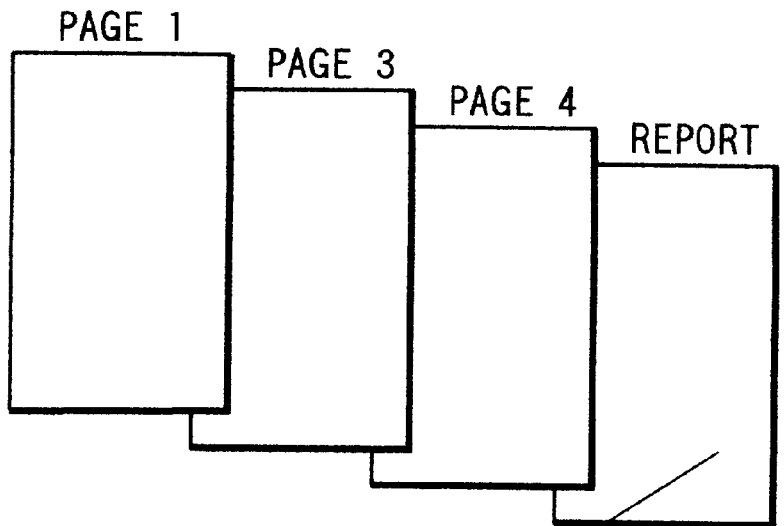
FIG. 8 is an explanatory diagram illustrating an output document, report contents, and output order according to the third embodiment.

In this manner, the report is output immediately after the output document is output. Therefore, a user can know easily which document the output report describes. FIG. 8 is an explanatory diagram showing the state of an output document and the output order.

The output document includes all pages except the second color page, and the report is output immediately after the document. This report indicates that the second page of the document with a reception number 2613 is a color page and this color page has already been output.

The reception number is printed on the output page as a reception page header or footer. Therefore, with a printed reception number on the report, a user can easily know a correspondence between the already output color pages, presently output monochrome pages, and the report.

Figure 9:
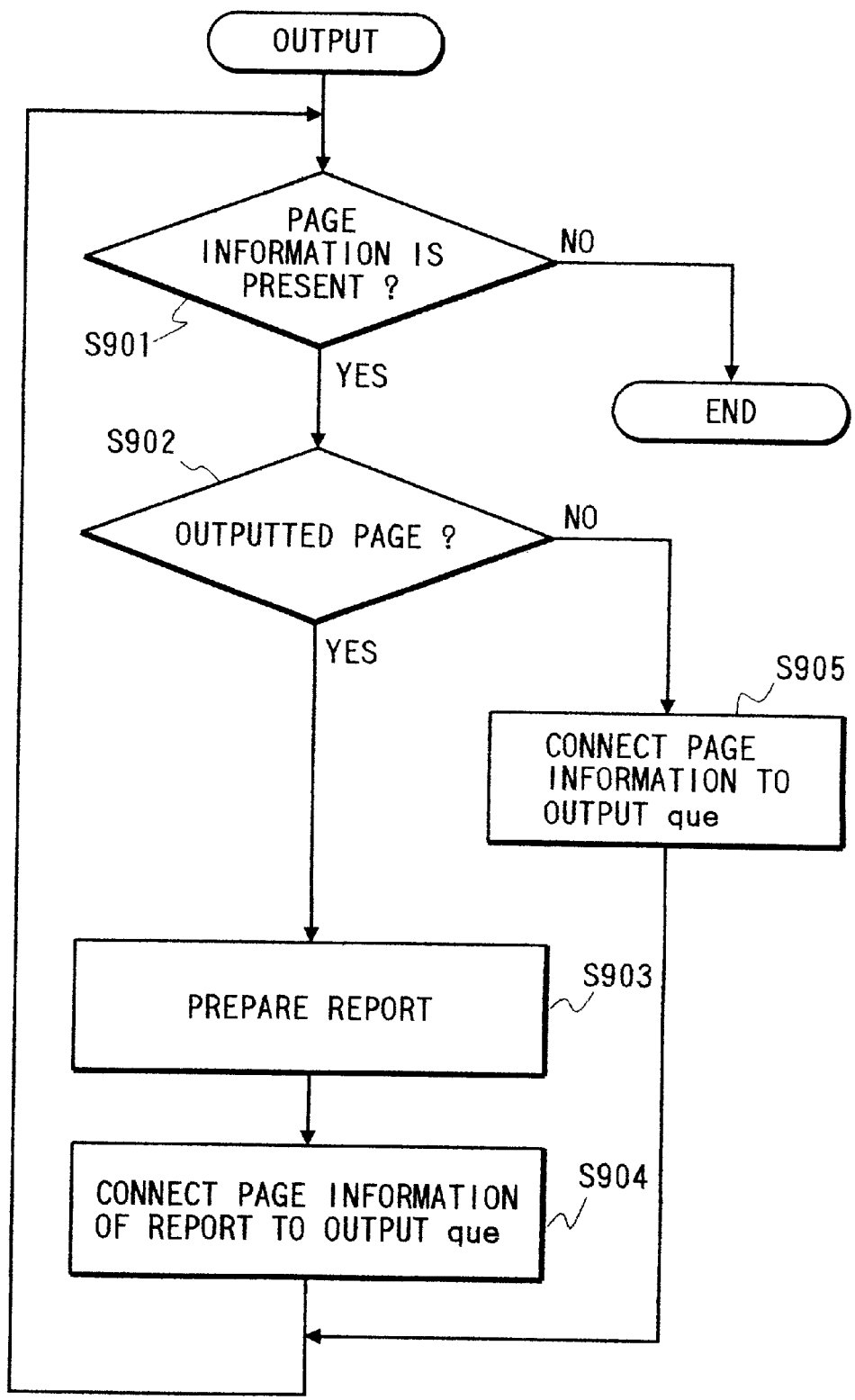
FIG. 9 is a flow chart illustrating an operation sequence of the fourth embodiment.

Next, the fourth embodiment of the invention will be described. FIG. 9 is a flow chart illustrating the operation sequence of the fourth embodiment. In this sequence, a received document not still output is output after a predetermined time lapse or by predetermined operations.

It is checked whether there is page information of an output document (S901). If there is page information, it is checked whether the page has already been output (S902). This check can be performed by referring to the output flag of the page information shown in FIG. 5.

If it is judged that the page has already been output, i.e., if the received page is a color page and was output upon reception, a report is formed which describes to the effect that the page has already been output (S903).

The page information of the report is overwritten on the page information of the already output page and connected to the output process que (S904). Thereafter, the sequence returns to S901 to process the next page.

If it is judged at S902 that the page has not yet been output, the page information is connected to the output process queue for the output process (S905). The page information connected to the output que is sequentially output to the printer starting from the top of the output process que when the image output program is activated, although this process is not illustrated in the flow chart of FIG. 7. After completion of output of each page, the page information is released.

After the page information is connected to the output que at S905, the sequence returns to S901 to process the next page. If it is judged at S901 that there is no page information of the output document, it is judged that all pages have been passed to the output process program, and this sequence is terminated.

Since the report is output at the page where the already output page is to be output, a user can know easily which page the output report describes.

Figure 10:
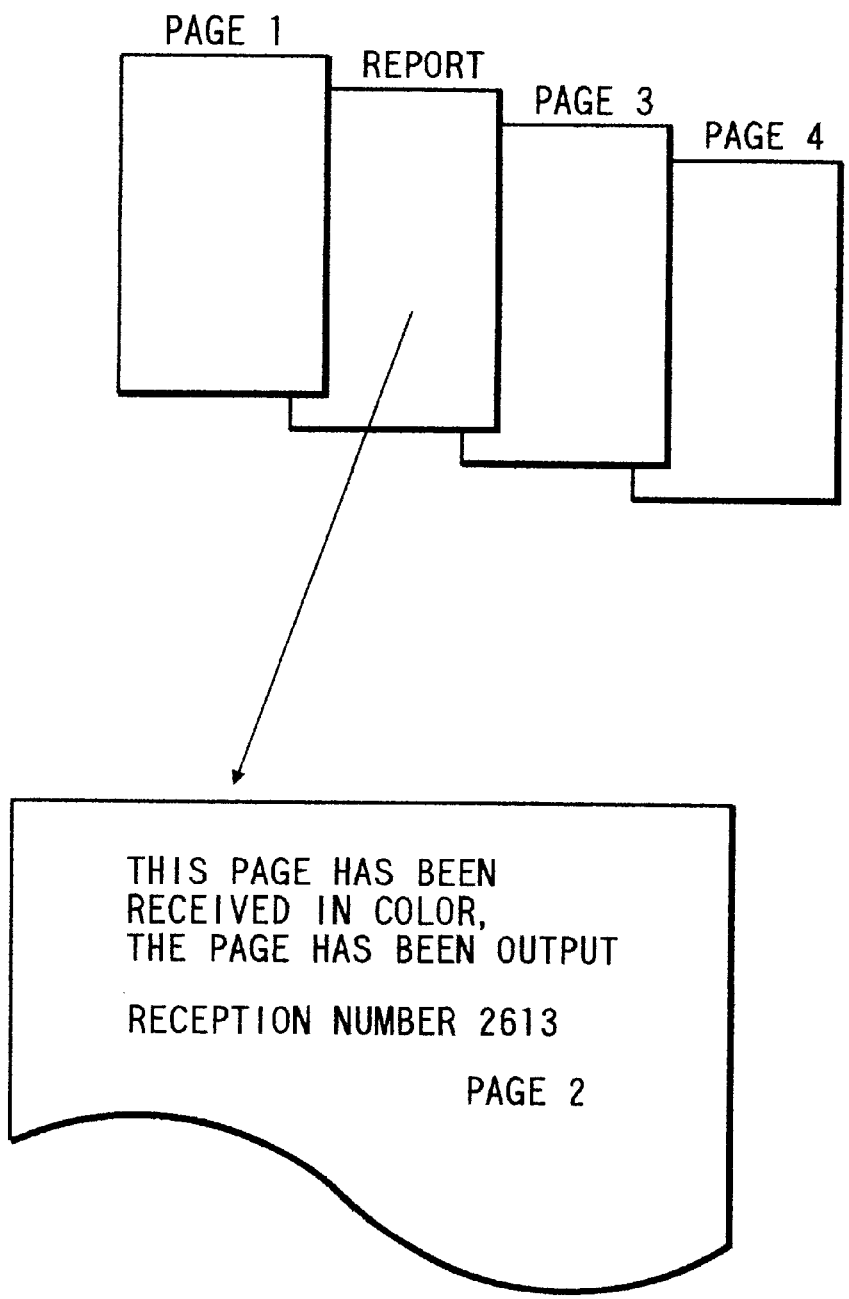
FIG. 10 is an explanatory diagram illustrating an output document, report contents, and output order according to the fourth and eighth embodiments.

FIG. 10 is an explanatory diagram showing the state of an output document and the output order., The output document has the report replaced by the second color page. This report indicates that the second page of the document with a reception number 2613 is a color page and this color page has already been output.

The reception number is printed on the output page as a reception page header or footer. Therefore, with a printed reception number on the report, a user can easily know a correspondence between the already output color pages, presently output monochrome pages, and the report.

Figure 11:
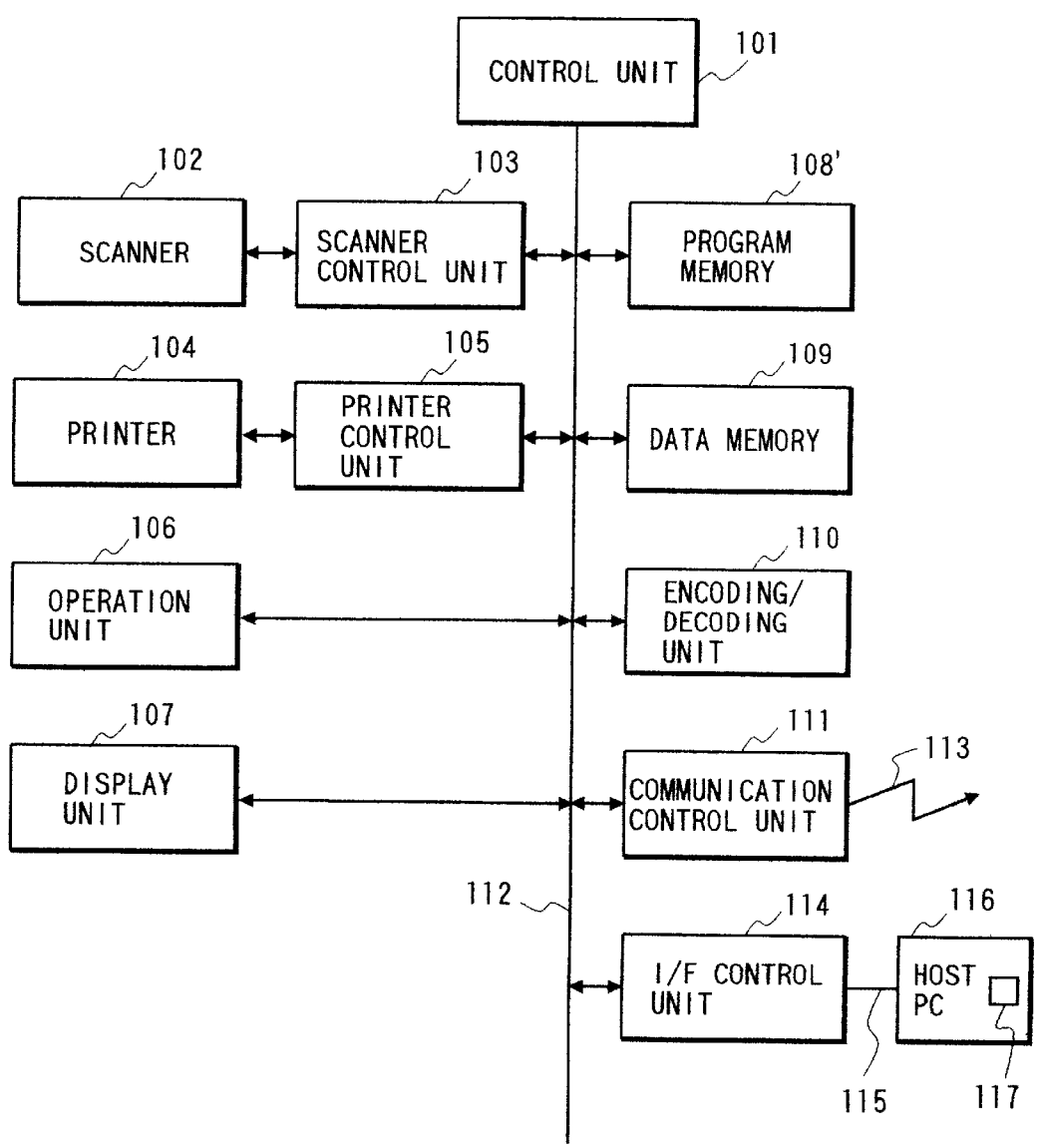
FIG. 11 is a block diagram showing the structure of a facsimile apparatus according to the fifth to eighth embodiments of the invention.

FIG. 11 is a block diagram showing the structure of a facsimile apparatus according to the fifth to eighth embodiments of the invention.

In addition to the structure shown in FIG. 1, this facsimile apparatus has a color page enforced transfer switch mounted on the operation unit, and an interface (I/F) control unit 114 for interconnecting via a collection line 115 the facsimile apparatus and a host computer 116. The other structures are the same as the embodiment shown in FIG. 1, and the description of each unit is omitted.

Figure 12:
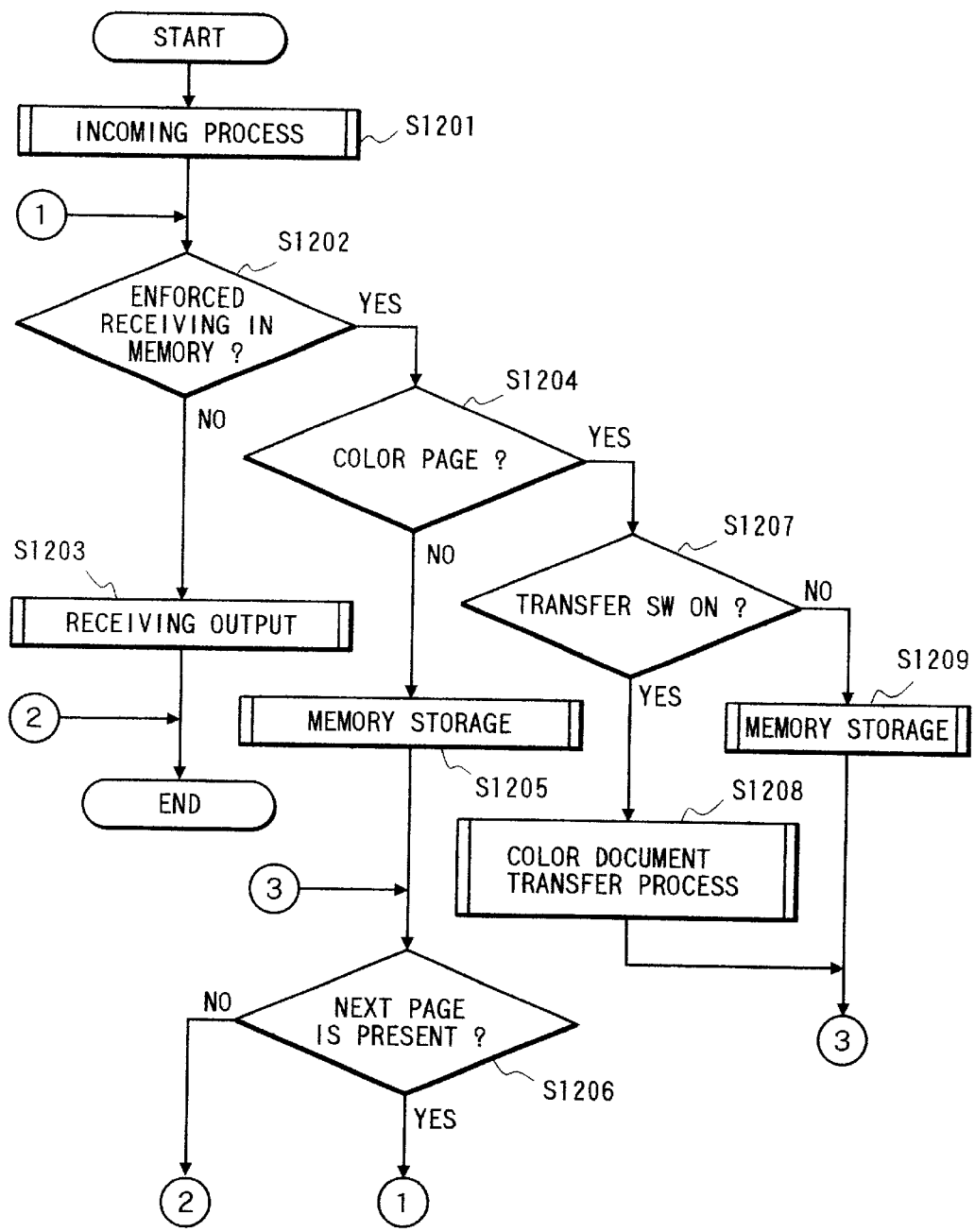
FIG. 12 is a flow chart illustrating an operation sequence of the fifth embodiment of the invention.

FIG. 12 is a flow chart illustrating an operation sequence of the fifth embodiment.

First an incoming process is performed at S1201. At this step, the number of a partner apparatus, an incoming time, and the like are obtained. Next, it is checked whether the present mode is an "enforced memory reception" or not (S1202).

If not, an ordinary reception output process is performed (S1203) to terminate this sequence.

If it is judged at S1202 that the present mode is the enforced memory reception mode, it is checked whether or not the page to be received is a color page (S1204).

If not, i.e., if a monochrome page, a memory storage is performed (S1205). In this memory storage process as shown in FIG. 3, it is first checked whether or not there is a vacant memory block (S301). The vacant memory block is a memory block which can be used for the reception process, and may be a reserved block for copy or report formation. With the reserved memory block, a copy or report output is possible even if a full state of the memory occurs during the reception process.

If there is a vacant memory block at S301, the memory block is acquired (S302), and the received image data is written (S303) to thereafter terminate this sequence.

If there is no vacant memory block at S301, a line disconnection process is executed (S304). In this line disconnection process, the memory block used by the received page is discarded and a line disconnection is notified to an operator by a displayed notice, alarm sounds, or voices, and if necessary a report is output. After completion of the line disconnection process, this sequence is terminated.

After completion of the memory storage as above, it is checked whether there is the next received page (S1206). If there is the next received page, the sequence returns to S1202 to repeat this sequence to the last received page.

If it is judged at S1204 that the received page is a color page, it is checked whether a color page enforced transfer switch SW is on, the switch SW determining whether the color page received during the enforced memory reception mode is transferred to an external apparatus (host computer 116) (S1207).

If the color page enforced transfer switch SW is on, a color page transfer process to the external apparatus is performed (S1208).

Figure 13:
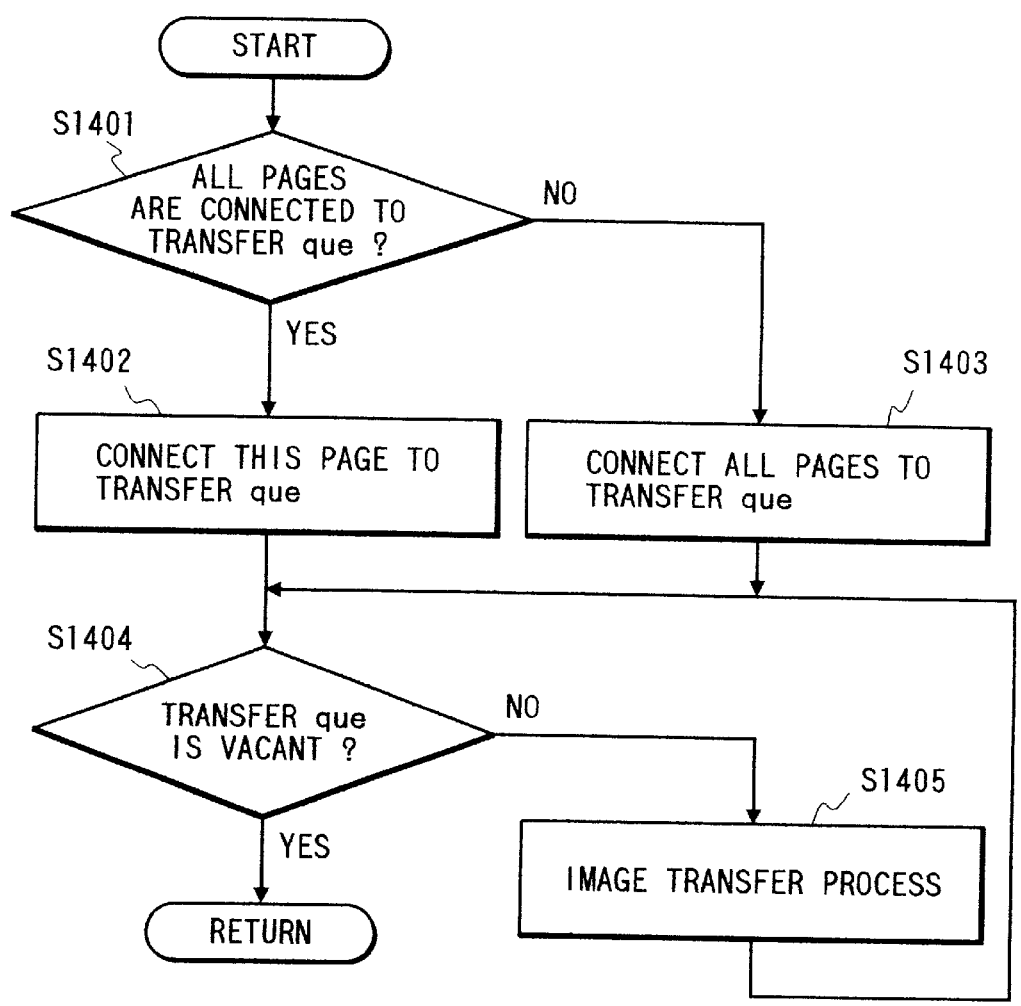
FIG. 13 is a flow chart illustrating an operation sequence of a color page reception output process.

FIG. 13 is a flow chart illustrating an operation sequence of the color page reception output process.

Figure 14:
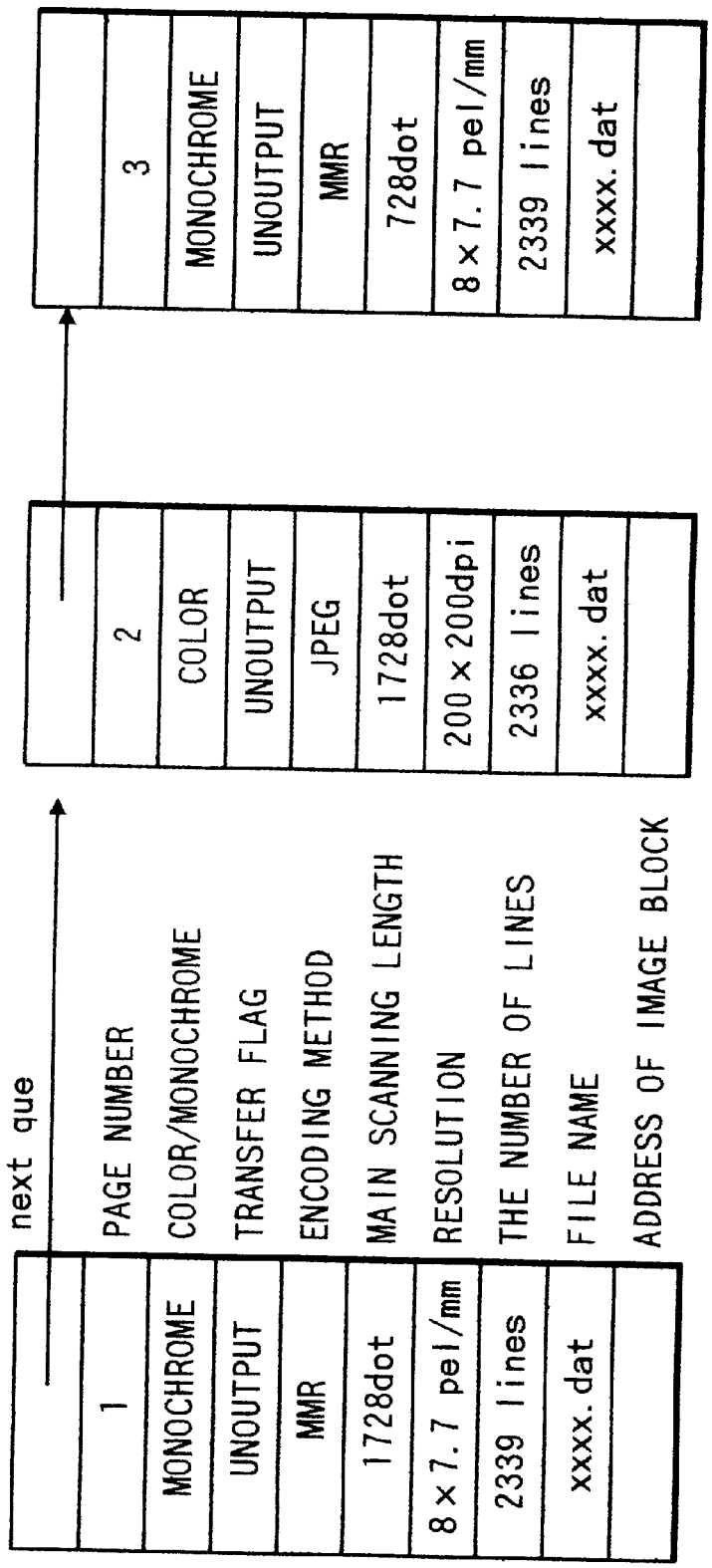
FIG. 14 is an explanatory diagram showing a format of page information according to the fifth to ninth embodiments.

It is first checked whether the preceding received pages have been already connected to a transfer process que (queue) (S1401). Page information is shown in FIG. 14 in which information of each page indicates the information of the next page.

If it is judged that the preceding received pages have been already connected to the transfer process que, the presently receiving page is connected to the output process que (S1402).

If it is judged at S1401 that the preceding pages are still not connected to the transfer process que, all pages including the presently receiving page are connected to the transfer process que (S1403).

Thereafter, it is checked at S1404 whether any image is loaded in the transfer process que. If not, the sequence is terminated. If there is an image loaded in the transfer process que, an actual image transfer process is performed in the unit of page (S1405) and the sequence returns to S1404.

Figure 15:
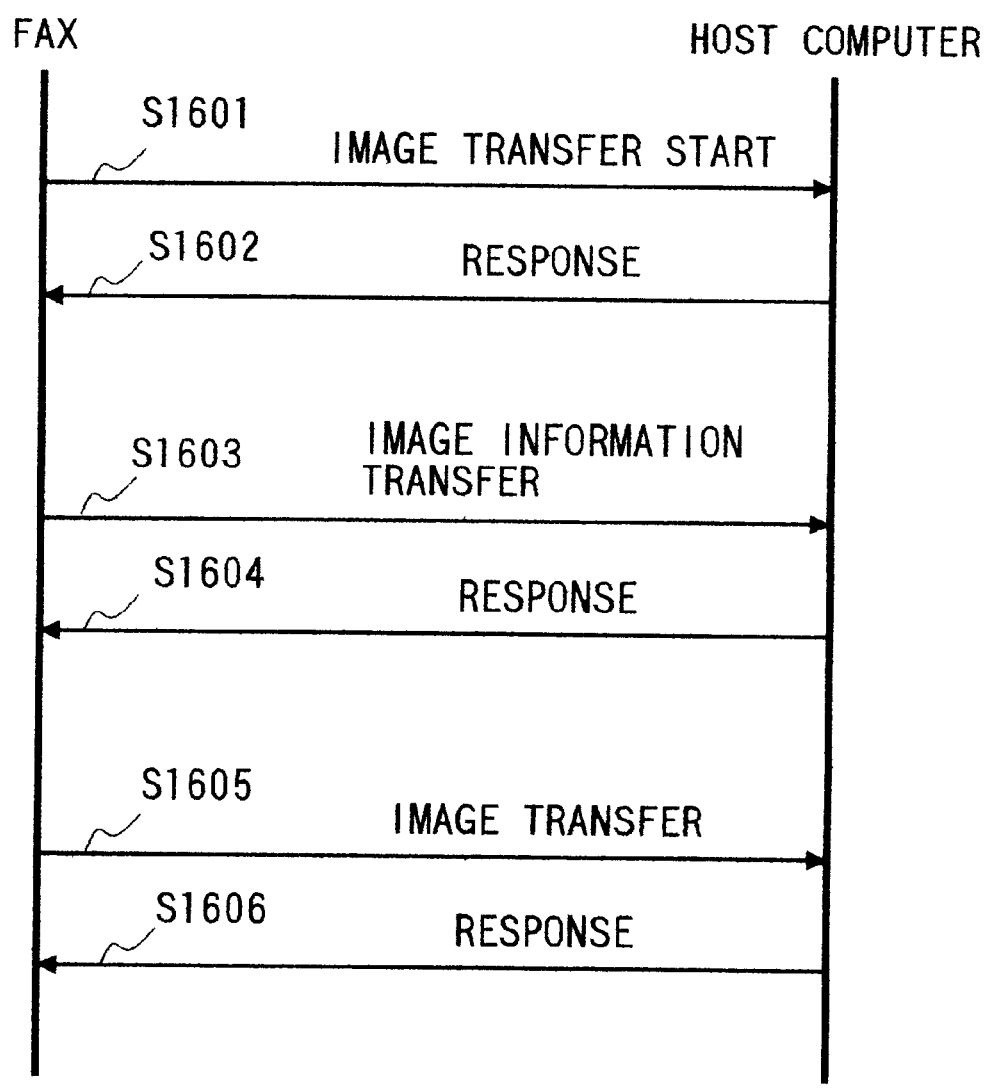
FIG. 15 is a sequence diagram illustrating an image transfer process in the unit of page according to the fifth to ninth embodiments.

FIG. 15 is a sequence diagram illustrating the image transfer process in the unit of page.

First, the facsimile apparatus (FAX) sends an image transfer start command (S1601), and the host computer sends back a response (S1602). Next, the facsimile apparatus transfers information (image information) added to the image, in this embodiment, the page information shown in FIG. 14 (S1603), and the host computer sends back a response (S1604). Next, the facsimile apparatus transfers an image (S1605), and the host computer sends back a response (S1606) to terminate the sequence. The last response includes a file name of the received document to be managed by the host computer.

After completion of the transfer process of the color document to the external apparatus at S1208 as above, it is checked whether there is the next page (S1206). If there is the next page, the sequence returns to S1202 to repeat the sequence until the last received page is processed.

If the color page enforced transfer switch SW is off at S1207, the memory storage process shown in FIG. 3 is executed (S1209) and it is checked whether there is the next received page (S1206). If there is the next received page, the sequence returns to S1202 to repeat this sequence to the last received page.

Figure 16:
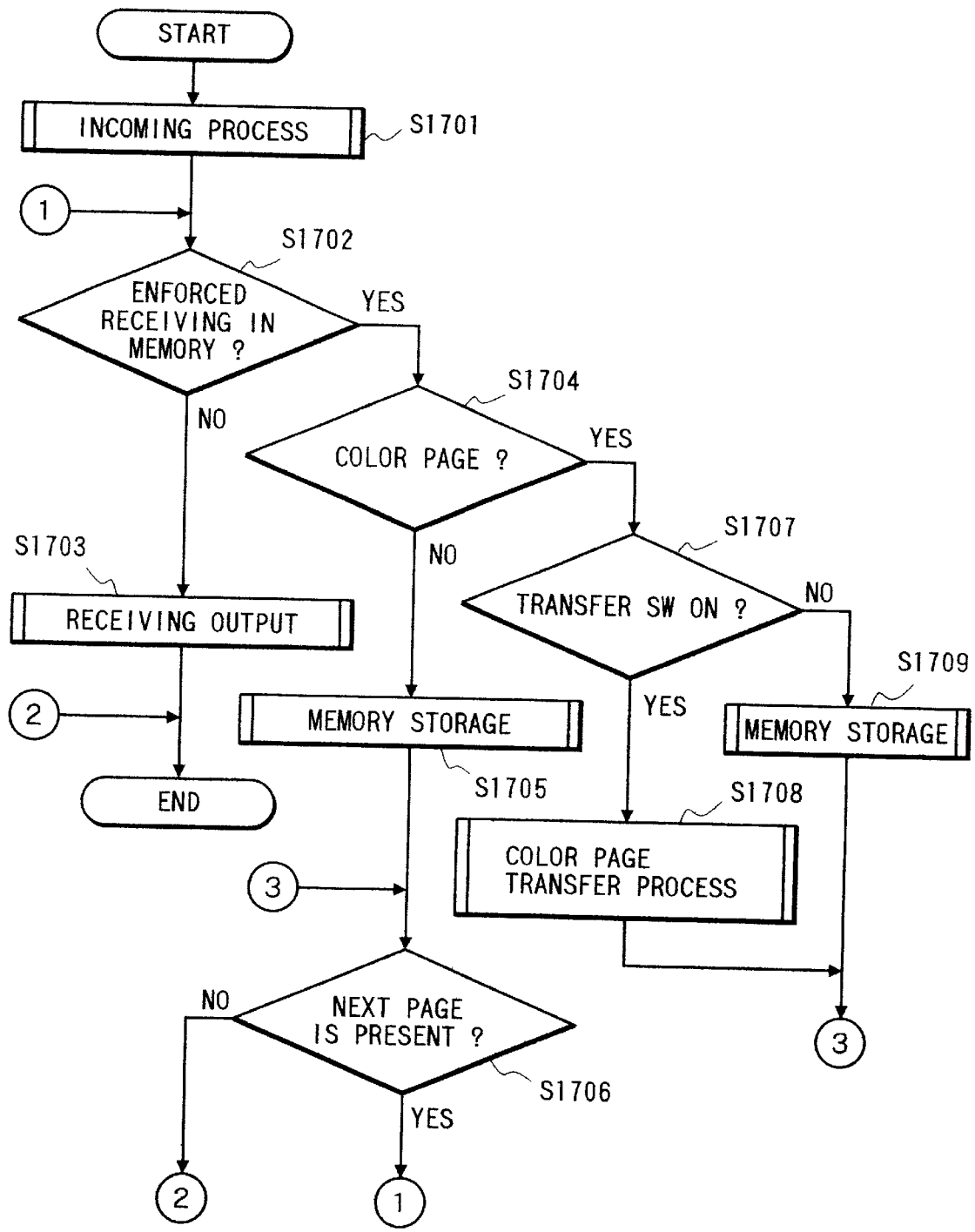
FIG. 16 is a flow chart illustrating an operation sequence of the sixth embodiment of the invention.

Next, the sixth embodiment of the invention will be described. FIG. 16 is a flow chart illustrating an operation sequence of the sixth embodiment.

First an incoming process is performed at S1701. At this step, the number of a partner apparatus, an incoming time, and the like are obtained. Next, it is checked whether the present mode is an "enforced memory reception" or not (S1702).

If not, an ordinary reception output process is performed (S1703) to terminate this sequence. If it is judged at S1702 that the present mode is the enforced memory reception mode, it is checked whether or not the page to be received is a color page (S1704).

If not, i.e., if a monochrome page, a memory storage is performed (S1705). In this memory storage process as shown in FIG. 3, it is first checked whether or not there is a vacant memory block (S301). The vacant memory block is a memory block which can be used for the reception process, and may be a reserved block for copy or report formation. With the reserved memory block, a copy or report output is possible even if a full state of the memory occurs during the reception process.

If there is a vacant memory block at S301, the memory block is acquired (S302), and the received image data is written (S303) to thereafter terminate this sequence.

If there is no vacant memory block at S301, a line disconnection process is executed (S304). In this line disconnection process, the memory block used by the received page is discarded and a line disconnection is notified to an operator by a display notice, alarm sounds, or voices, and if necessary a report is output. After completion of the line disconnection process, this sequence is terminated.

Figure 21:
FIG. 21 is a diagram showing an example printed out from a printer 104 when image data was transferred in step S1708 of the flow chart of FIG. 16.

In this case, if it is judged at S301 that there is no vacant memory block, the sequence may jump to S178 to transfer the received image data to the host computer. Also, if it is judged that there is no vacant memory block, the image data already stored in the memory may be read and transferred to the host computer. With such arrangements, the memory will not be overflowed by the received image data. In this case, data indicating that the received image data has been transferred to the host computer may be printed out by the printer 104 as illustrated in FIG. 21.

After completion of the memory storage as above, it is checked whether there is the next received page (S1706). If there is the next received page, the sequence returns to S1702 to repeat this sequence to the last received page.

If it is judged at S1704 that the received page is a color page, it is checked whether a color page enforced transfer switch SW is on, the switch SW determining whether the color page received during the enforced memory reception mode is transferred to an external apparatus (host computer 116) (S1707). If the color page enforced transfer switch SW is on, a color page transfer process to the external apparatus is performed (S1708).

In the transfer process of a color page to the external apparatus, a new page information area is obtained to copy the page information of the color page therein and connect to the transfer process que. In this case, the old page information area is left unchanged.

In the image transfer process in the unit of page as shown in FIG. 15, first, the facsimile apparatus (FAX) sends an image transfer start command (S1601), and the host computer sends back a response (S1602). Next, the facsimile apparatus transfers information (image information) added to the image, in this embodiment, the page information shown in FIG. 14 (S1603), and the host computer sends back a response (S1604). Next, the facsimile apparatus transfers an image (S1605), and the host computer sends back a response (S1606) to terminate the sequence. The last response includes a file name of the received document to be managed by the host computer.

After completion of the transfer process of the color document to the external apparatus at S1708 as above, it is checked whether there is the next page (S1706). If there is the next page, the sequence returns to S1702 to repeat the sequence until the last received page is processed.

If the color page enforced transfer switch SW is off at S1707, the memory storage process shown in FIG. 3 is executed (S1709) and it is checked whether there is the next received page (S1706). If there is the next received page, the sequence returns to S1702 to repeat this sequence to the last received page.

Figure 17:
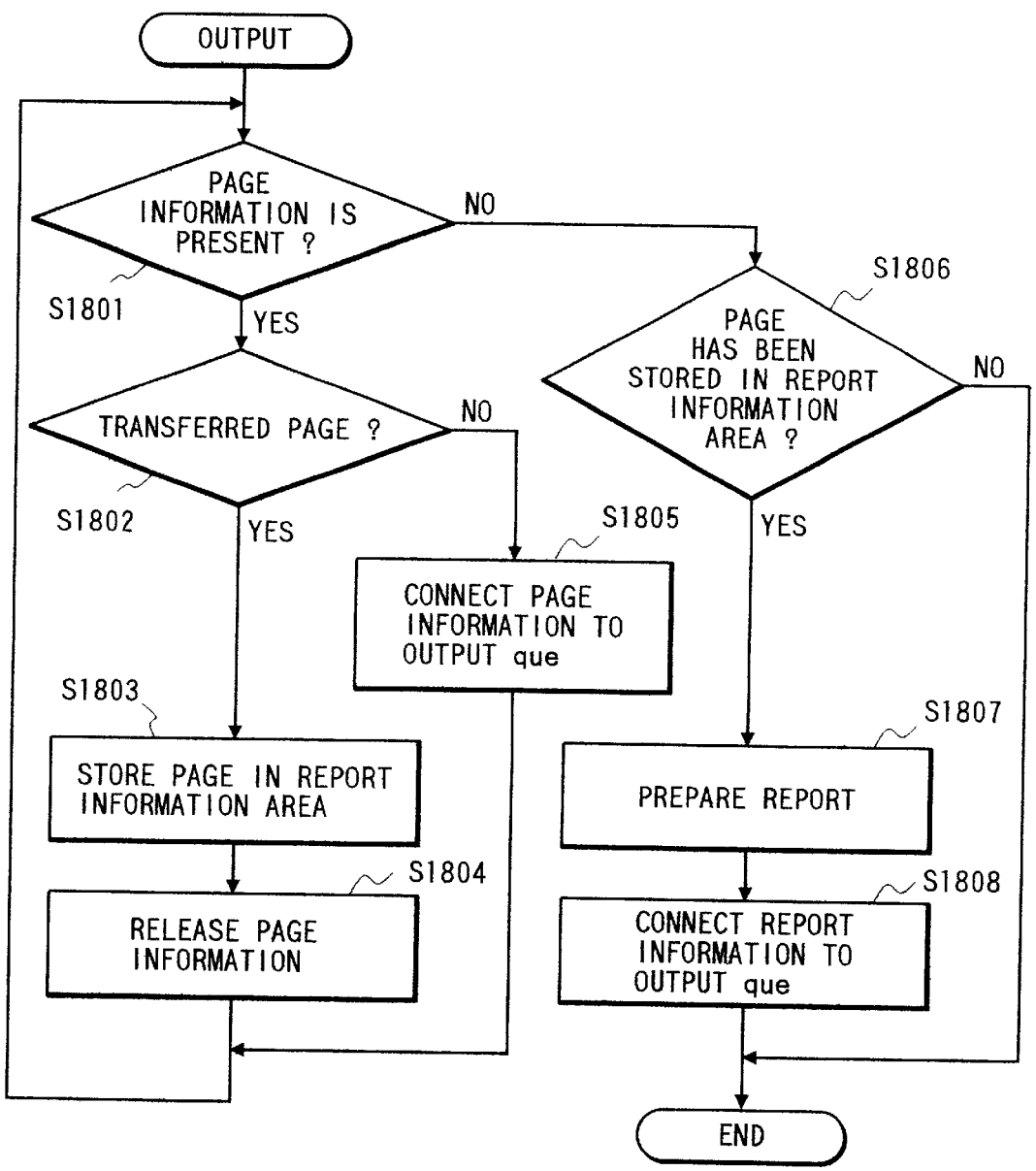
FIG. 17 is a flow chart illustrating an operation sequence of the seventh embodiment of the invention.

Next, the seventh embodiment of the invention will be described. FIG. 17 is a flow chart illustrating the operation sequence of the seventh embodiment. In this sequence, a received document not still output is output after a predetermined time lapse or by predetermined operations.

It is checked whether there is page information of an output document (S1801). If there is page information, it is checked whether the page has already been output (S1802). This check can be performed by referring to a transfer flag of the page information shown in FIG. 14. If it is judged that the page has already been transferred, i.e., if the received page is a color page and was transferred upon reception, then the page number of this page is stored in the report information area (S1803).

It is judged that this page information has already been used, and this page information is released (S1804) and the sequence returns to S1801 to process the next page.

If it is judged at S1802 that the page has not yet been output, the page information is connected to the output process queue for the output process (S1805).

The page information connected to the output que is sequentially output to the printer starting from the top of the output process que when the image output program is activated.

After the page information is connected to the output que at S1805, the sequence returns to S1801 to process the next page. If it is judged at S1801 that there is no page information of the output document, it is judged that all pages have been passed to the output process program, and it is checked whether the page number stored at S1803 is being stored in the report information area (S1806).

If there is no page number stored, this sequence is terminated. If it is judged at S1806 that one or more page numbers are being stored, a report is formed (S1807) and the page information of the report is connected to the output process que (S1808).

In this manner, the report is output immediately after the output document is output. Therefore, a user can know easily which document the output report describes. FIG. 8 is an explanatory diagram showing the state of an output document and the output order.

The output document includes all pages except the second color page, and the report is output immediately after the document. This report indicates that the second page of the document with a reception number 2613 is a color page and this color page has already been transferred to the external apparatus.

The reception number is printed on the output page as a reception page header or footer. Therefore, with a printed reception number on the report, a user can easily know a correspondence between the already output color pages, presently output monochrome pages, and the report.

Figure 18:
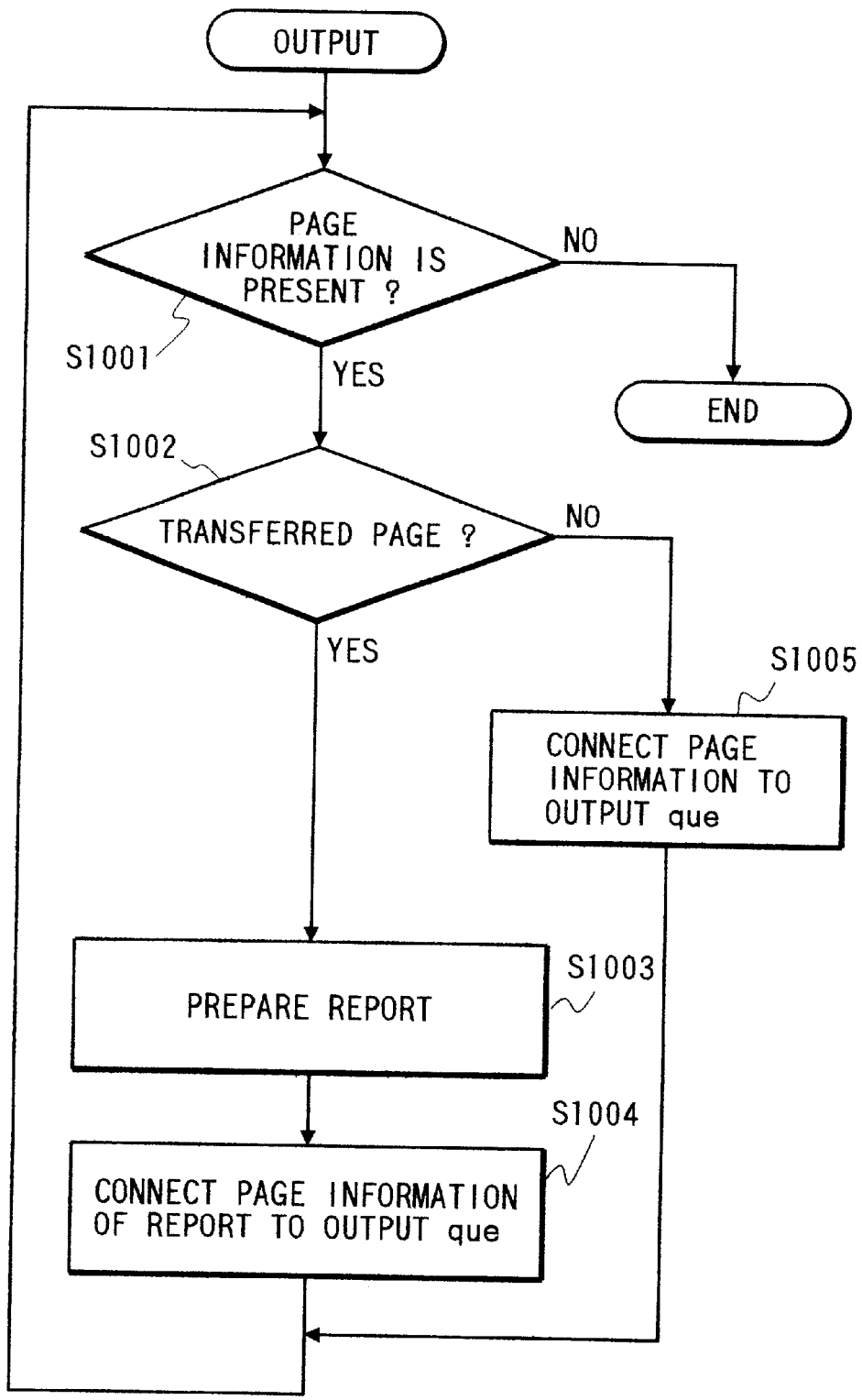
FIG. 18 is a flow chart illustrating an operation sequence of the eighth embodiment of the invention.

Next, the eighth embodiment of the invention will be described. FIG. 18 is a flow chart illustrating the operation sequence of the eighth embodiment. In this sequence, a received document not still output is output after a predetermined time lapse or by predetermined operations.

It is checked whether there is page information of an output document (S1001). If there is page information, it is checked whether the page has already been transferred to the external apparatus (S1002). This check can be performed by referring to the transfer flag of the page information shown in FIG. 14.

If it is judged that the page has already been transferred, i.e., if the received page is a color page and was transferred upon reception, a report is formed which describes to the effect that the page has already been transferred (S1003).

The page information of the report is overwritten on the page information of the already transferred page and connected to the output process que (S1004). Thereafter, the sequence returns to S1001 to process the next page.

If it is judged at S1002 that the page has not yet been transferred, the page information is connected to the output process queue for the output process (S1005). The page information connected to the output que is sequentially output to the printer starting from the top of the output process que when the image output program is activated. After completion of output of each page, the page information is released.

After the page information is connected to the output que at S1005, the sequence returns to S1001 to process the next page. If it is judged at S1001 that there is no page information of the output document, it is judged that all pages have been passed to the output process program, and this sequence is terminated.

Since the report is output at the page where the already transferred page is to be output, a user can know easily which page the output report describes.

FIG. 10 is an explanatory diagram showing the state of an output document and the output order. The output document has the report replaced by the second color page. This report indicates that the second page of the document with a reception number 2613 is a color page and this color page has already been transferred.

The reception number is printed on the output page as a reception page header or footer. Therefore, with a printed reception number on the report, a user can easily know a correspondence between the already output color pages, presently output monochrome pages, and the report.

Figure 19:
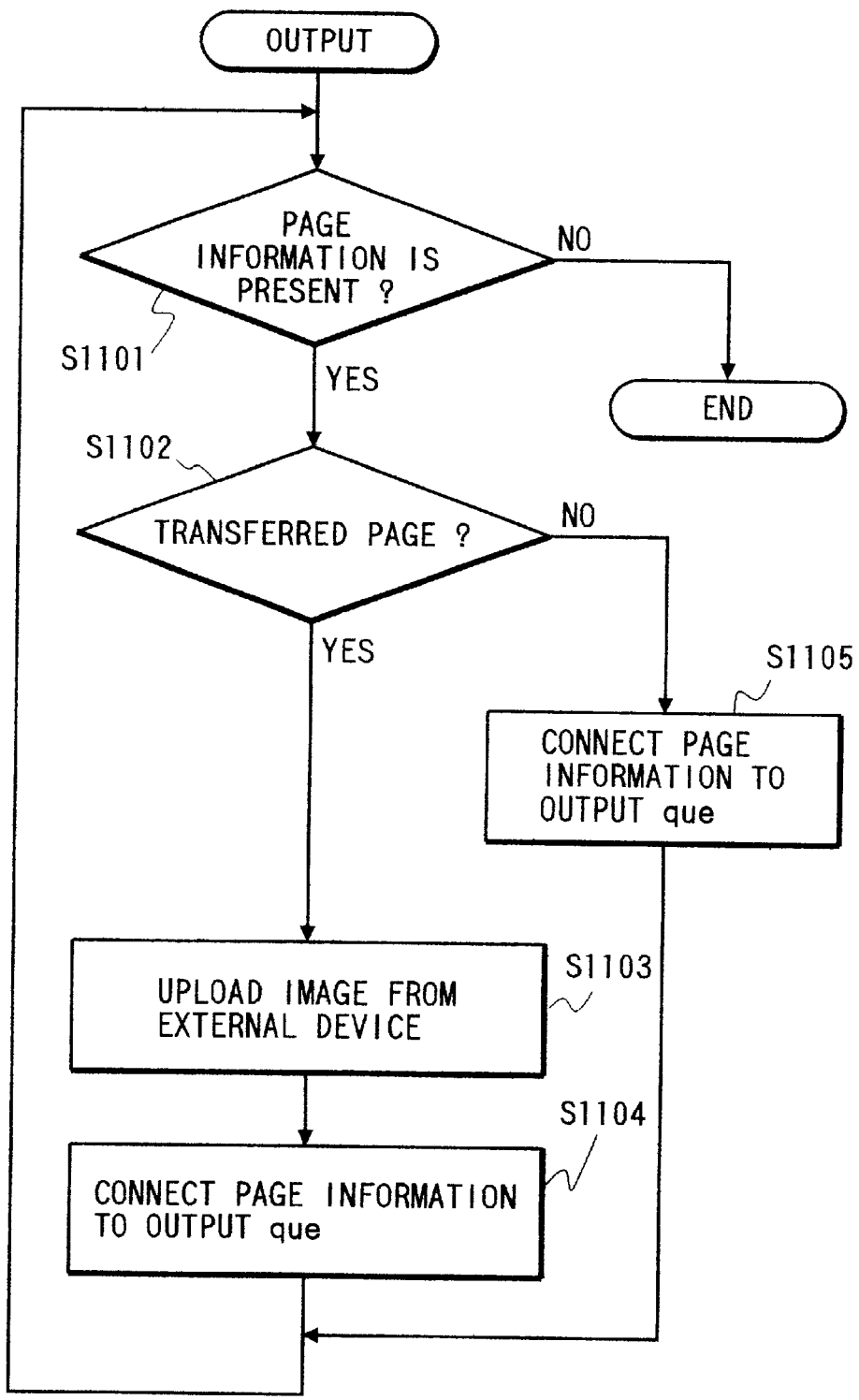
FIG. 19 is a flow chart illustrating an operation sequence of the ninth embodiment of the invention.

Next, the ninth embodiment of the invention will be described. FIG. 19 is a flow chart illustrating the operation sequence of the ninth embodiment. In this sequence, a received document not still output is output after a predetermined time lapse or by predetermined operations.

It is checked whether there is page information of an output document (S1101). If there is page information, it is checked whether the page has already been transferred to the external apparatus (S1102). This check can be performed by referring to a transfer flag of the page information shown in FIG. 14.

If it is judged that the page has already been transferred, i.e., if the received page is a color page and was transferred to the external apparatus upon reception, then an uploading process is performed for uploading the image from the external apparatus.

Figure 20:
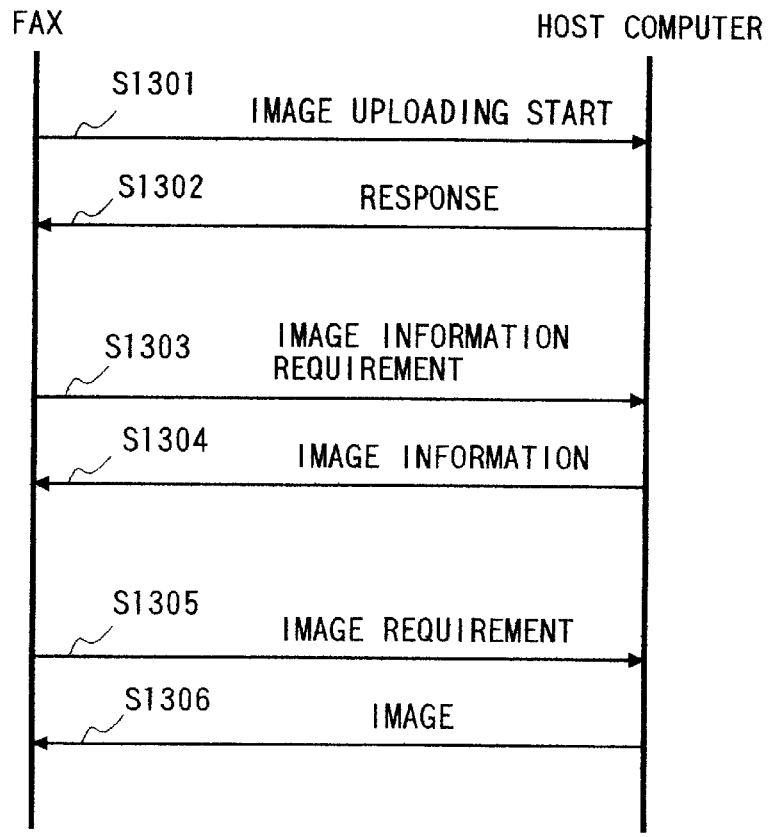
FIG. 20 is a sequence diagram illustrating an image upload process in the unit of page according to the ninth embodiment.

FIG. 20 is a sequence diagram illustrating an image uploading process in the unit of page. First, the facsimile apparatus sends an image uploading start command (S1301). This command has a parameter of a file name of the image to be uploaded. This file name was written in the page information when the image was transferred.

Next, the host computer sends back a response (S1302), the facsimile apparatus requests information (image information) added to the image (S1303), and the host computer transfers the image information (S1304). Next, the facsimile requests an image (S1305), and the host computer transfers the image (S1306) to terminate the sequence.

After completion of the above process, the page information of the uploaded image is overwritten on the page information of the already transferred page and connected to the output que (S1104). Thereafter, the sequence returns to S1101 to process the next page.

If it is judged at S1102 that the page has not yet been transferred, the page information is connected to the output process queue for the output process (S1105). The page information connected to the output que is sequentially output to the printer starting from the top of the output process que when the image output program is activated. After completion of output of each page, the page information is released.

After the page information is connected to the output que at S1105, the sequence returns to S1101 to process the next page. If it is judged at S1101 that there is no page information of the output document, it is judged that all pages have been passed to the output process program, and this sequence is terminated.

In the above manner, an uploaded image is output at the page where the already transferred page is output. Therefore, without providing the facsimile with a large capacity of memory, a color image can be received by the external apparatus instead of storing it in the memory of the facsimile apparatus.

Each control procedure of the above embodiments is stored in the program memory 108 shown in FIG. 1 or in the program memory 108' of FIG. 11. The control unit 101 shown in FIGS. 1 and 11 is constituted by a microcomputer running programs stored in the program memory.

The invention features not only in the structures of the apparatus of the embodiments but also in the image processing method illustrated by the control procedures shown in the above-described flow charts. The invention also features in a program memory for storing programs which make the microcomputer execute the above-described control procedures. Such programs are indicated at 117 in FIG. 11. Specifically, the program comprises the steps of receiving an image data transfer instruction from a communication apparatus; judging from the transfer instruction whether the image transfer can be acknowledged or not; storing the image data from the communication apparatus according to the judgement result; and sending data for the communication apparatus to designate the stored image data, back to the communication apparatus. The program may further comprise the step of notifying a user of storage of the image data by using a display device or speaker of a host computer. The program may further comprise the step of outputting the stored image data to the communication apparatus in response to a request from the communication apparatus. In order to execute the above steps of the invention, the host computer executes the step of bidirectionally communicating with the communication apparatus.

As described so far, according to the embodiments, when a document containing a color page is received while the received document is controlled not to be output, (1) all pages of this received document only are allowed to be output, (2) only color pages of this document are output, (3) all pages of this document only are transferred to an external apparatus, or (4) only color pages of this document are transferred to the external apparatus. Accordingly, an image memory can be advantageously prevented from being made full and entering a reception disable state.

Further, when a received document including a color page is output after a predetermined time lapse or by predetermined operations, (5) an operator is notified of that a color page has already been output or transferred to an external apparatus, or (6) a report is output by replacing a color page of a document. Accordingly, advantageous effects are that a correspondence between the color and monochrome pages of the received document can be made easy.

Still further, when a received document whose color page has already been output is output after a predetermined time lapse or by predetermined operations, (7) the color page of the document is uploaded from an external apparatus and output. Accordingly, advantageous effects are that reproduction of a received document including a color image is made possible while avoiding a memory full-state of the facsimile apparatus.

What is claimed is:

1. A communication apparatus comprising:
   a communication unit adapted to transfer monochrome and color images;
   a storage unit adapted to store an image;
   a setting unit adapted to set a memory reception mode in which a received document is stored in said storage unit without printing and outputting the received document;
   a control unit adapted to, when a document is received in the memory reception mode and includes at least one color page, cause only the at least one color page of the document to be outputted, without leaving data of the at least one color page stored in said storage unit; and
   a notification unit adapted to, after the document including the at least one color page has been outputted, notify an operator of said communication apparatus that the at least one color page has already been outputted.

2. A communication apparatus according to claim 1, wherein said notification unit outputs a report instead of the at least one color page of the document.

3. A communication apparatus comprising:
   a communication unit adapted to transfer monochrome and color images;

a storage unit adapted to store an image;

an external interface unit adapted to connect said communication apparatus to an external apparatus capable of storing a reception image;

a transfer unit adapted to transfer a reception image via said external interface unit to the external apparatus;

a setting unit adapted to set a memory reception mode in which a received document is stored in said storage unit without printing and outputting the received document, wherein, when a document received in the memory reception mode includes at least one color page, said transfer unit transfers only the at least one color page of the document to the external apparatus, without leaving data of the at least one color page stored in said storage unit; and a notification unit adapted to, after said transfer unit transfers the at least one color page of the document, notify an operator of said communication apparatus of a transfer state of said transfer unit.

4. A communication apparatus according to claim 3, wherein said notification unit outputs a predetermined image instead of the at least one color page of the document.

5. A communication apparatus according to claim 3, further comprising an output unit adapted to output reception data stored in said storage unit by reading image data transferred to the external apparatus.

6. An image processing method comprising the steps of:

transferring monochrome and color images;

storing an image in a storage unit;

setting a memory reception mode in which a received document is stored in the storage unit without printing and outputting the received document;

causing, when a document is received in the memory reception mode and includes at least one color page, only the at least one color page of the document to be outputted, without leaving data of the at least one color page stored in the storage unit; and notifying, after the at least one color page of the document has been outputted, an operator that the at least one color page has already been outputted.

7. A method according to claim 6, wherein, when the operator is notified, a report instead of the at least one color page of the document is outputted.

8. An image processing method operative in a communication apparatus connected to an external apparatus via an interface, said method comprising the steps of:

transferring monochrome and color images;

storing an image in a storage unit;

transferring a reception image via the interface to the external apparatus, which is capable of storing the reception image;

setting a memory reception mode in which a received document is stored in the storage unit without printing and outputting the received document, wherein, when a document received in the memory reception mode includes at least one color page, said transferring step transfers only the at least one color page of the document to the external apparatus, without leaving data of the at least one color page stored in the storage unit; and notifying, after said transferring step transfers the at least one color page of the document, an operator of the communication apparatus of a transfer state of said transferring step.

9. A method according to claim 8, wherein, when the operator is notified, a report instead of the at least one color page of the document is outputted.

10. A method according to claim 8, wherein, when a document received in the memory reception mode and stored in the storage unit is outputted, and if the document includes at least one color page already transferred to the external apparatus, the document is uploaded from the external apparatus and outputted.

* * * * *

UNITED STATES PATENT AND TRADEMARK OFFICE
CERTIFICATE OF CORRECTION

PATENT NO.     : 6,414,759 B1                                         Page 1 of 1
DATED          : July 2, 2002
INVENTOR(S)    : Itaru Ikegami et al.

It is certified that error appears in the above-identified patent and that said Letters Patent is hereby corrected as shown below:

Title page,
Item [56], References Cited, FOREIGN PATENT DOCUMENTS,
"6125469" should read -- 6-125469 --.

Column 1,
Line 11, "apparatus" should read -- apparatus has --.
Line 66, "first" should read -- the first --.

Column 4,
Line 8, "await" should read -- wait --.

Column 6,
Line 15, "to the effect" should be deleted.
Line 40, "order.," should read -- order. --.

Column 7,
Line 6, "if" should read -- if it is --.

Column 8,
Line 31, "if" should read -- if it is --.

Signed and Sealed this

Fourteenth Day of January, 2003

JAMES E. ROGAN
*Director of the United States Patent and Trademark Office*